US012128845B2

(12) United States Patent
Jaradi et al.

(10) Patent No.: US 12,128,845 B2
(45) Date of Patent: Oct. 29, 2024

(54) CABLE SUPPORTED AIRBAG INFLATABLE ACROSS DOOR OPENING (71) Applicant: Ford Global Technologies, LLC, Dearborn, MI (US)

(72) Inventors: Dean M. Jaradi, Macomb, MI (US); S. M. Iskander Farooq, Novi, MI (US); Mohammad Omar Faruque, Ann Arbor, MI (US); Rahul Arora, Birmingham, MI (US); Saeed D. Barbat, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 35 days.

(21) Appl. No.: 17/932,372

(22) Filed: Sep. 15, 2022

(65) Prior Publication Data

US 2024/0092304 A1 Mar. 21, 2024

(51) Int. Cl.
*B60R 21/213* (2011.01)
*B60R 21/231* (2011.01)
*B60R 21/2338* (2011.01)

(52) U.S. Cl.
CPC ...... *B60R 21/213* (2013.01); *B60R 21/23138* (2013.01); *B60R 21/2338* (2013.01)

(58) Field of Classification Search
CPC ............ B60R 21/213; B60R 21/23138; B60R 21/2338; B60R 21/21; B60J 5/0427
See application file for complete search history.

(56) References Cited

U.S. PATENT DOCUMENTS

| | | | |
|---|---|---|---|
| 6,152,481 A | 11/2000 | Webber et al. | |
| 6,237,942 B1 | 5/2001 | Swann | |
| 6,733,035 B2 | 5/2004 | Thomas et al. | |
| 7,234,765 B1 | 6/2007 | Mazzei et al. | |
| 7,472,922 B2 | 1/2009 | Wu et al. | |
| 10,682,972 B2 | 6/2020 | Faruque et al. | |
| 2007/0102906 A1* | 5/2007 | Wu | B60R 21/23184 280/730.2 |
| 2009/0278363 A1 | 11/2009 | Browne et al. | |
| 2014/0346758 A1* | 11/2014 | Mueller | B60R 21/213 280/730.2 |
| 2018/0251014 A1* | 9/2018 | Baccouche | B60J 5/0479 |
| 2019/0366967 A1* | 12/2019 | Faruque | B60R 21/232 |

(Continued)

FOREIGN PATENT DOCUMENTS

| | | | | |
|---|---|---|---|---|
| DE | 19642686 C1 * | 12/1997 | ............. | B60R 19/00 |
| DE | 102014201527 A1 * | 7/2015 | .............. | B60J 5/044 |

(Continued)

*Primary Examiner* — Karen Beck
(74) *Attorney, Agent, or Firm* — Frank A. MacKenzie; Bejin Bieneman PLC (57) ABSTRACT

A vehicle includes a front pillar and a rear pillar spaced along a vehicle-longitudinal axis. The front pillar and the rear pillar define a door opening therebetween. The vehicle includes a first track on the front pillar and a second track on the rear pillar. A cable is moveably engaged with the first track and the second track from an undeployed position to a raised position. The cable extends across the door opening from the first track to the second track in the raised position. An airbag is moveable with the cable from the undeployed position to the raised position. The airbag is supported by the cable in the raised position.

19 Claims, 9 Drawing Sheets

(56) References Cited

U.S. PATENT DOCUMENTS

2021/0101556 A1* 4/2021 Jaradi ................. B60R 21/2334
2021/0394702 A1  12/2021 Farooq et al.

FOREIGN PATENT DOCUMENTS

| DE | 102021126521 A1 | * | 4/2022 | ............ B60J 5/0468 |
| GB | 2579384 A | * | 6/2020 | ................ B60J 5/00 |
| JP | H08507267 A | * | 8/1996 | |

* cited by examiner

CABLE SUPPORTED AIRBAG INFLATABLE ACROSS DOOR OPENING

BACKGROUND

A vehicle may include amenities that allow occupants ingress and egress of the vehicle. For example, a vehicle may not include a vertical, body-mounted pillar between the front pillar and rear pillar of a door opening to allow more space for occupants to ingress and egress the vehicle. Specifically, such vehicles may include two doors that meet at the location traditionally occupied by the vertical, body-mounted pillar when in a closed position. The door may be rotatable about the front pillar and the rear pillar, respectively, such that the doors rotate away from each other to an open position.

DETAILED DESCRIPTION

A vehicle includes, a front pillar and a rear pillar spaced along a vehicle-longitudinal axis. The front pillar and the rear pillar define a door opening therebetween. The vehicle includes a first track on the front pillar and a second track on the rear pillar. A cable is moveably engaged with the first track and the second track from an undeployed position to a raised position. The cable extends across the door opening from the first track to the second track in the raised position. An airbag is moveable with the cable from the undeployed position to the raised position. The airbag is supported by the cable in the raised position.

The vehicle may include a first pyrotechnic actuator fixed to the front pillar and operatively connected to the cable to move the cable to the raised position. The vehicle may include a second pyrotechnic actuator fixed to the rear pillar and operatively connected to the cable to move the cable to the raised position. A first tether may extend from the first pyrotechnic actuator to the cable and a second tether may extend from the second pyrotechnic actuator to the cable. The first tether may be connected to a vehicle-forward end of the cable and the second tether is connected to a vehicle-rearward end of the cable.

The vehicle may include a pyrotechnic actuator fixed relative to the first track and the second track and operatively connected to the cable.

The vehicle may include a second cable below the cable in the raised position. The airbag may extend from the cable to the second cable when the cable is in the raised position.

The second cable may be moveably engaged with the first track and the second track from an undeployed position to a raised position. The second cable extends across the door opening from the first track to the second track in the raised position. The airbag may be supported by the second cable when the second cable is in the raised position. The vehicle may include a sill covering between the front pillar and the rear pillar. The cable, the second cable, and the airbag may be below the sill covering when the cable and the second cable are in the undeployed position.

The airbag may extend from the front pillar to the rear pillar when the cable is in the raised position.

The airbag is elongated along the vehicle-longitudinal axis between the front pillar to the rear pillar when the cable is in the raised position.

The cable and the airbag are vehicle-inboard of the door opening when the cable is in the raised position.

The vehicle may include a front door supported by the front pillar and a rear door supported by the rear pillar, the front door, and the rear door each may be moveable from an open position to the closed position. The front door and the rear door may abut each other in the closed position. The cable may be vehicle-inboard of the front door and the rear door when the cable is in the raised position and the doors are in the closed position.

The first track and the second track may be each elongated generally vertically.

The cable may structurally interconnect the front pillar and the rear pillar in the raised position.

With reference to the Figures, wherein like numerals indicate like parts throughout the several views, a vehicle 10 includes a front pillar 12 and a rear pillar 14 spaced along a vehicle-longitudinal axis L. The front pillar 12 and the rear pillar 14 define a door opening 16 therebetween. The vehicle 10 includes a first track 18 on the front pillar 12 and a second track 20 on the rear pillar 14. A cable 22 is moveably engaged with the first track 18 and the second track 20 from an undeployed position to a raised position. The cable 22 extends across the door opening 16 from the first track 18 to the second track 20 in the raised position. An airbag 24 is moveable with the cable 22 from the undeployed position to the raised position. The airbag 24 is supported by the cable 22 in the raised position.

The cable 22 may be in the undeployed position for occupant ingress and egress. Since the cable 22 extends across the door opening 16 in the raised position and the airbag 24 is supported by the cable 22 in the raised position, the airbag 24 is at the door opening 16 when the cable 22 is in the raised position. Specifically, since the airbag 24 is moveable with the cable 22, the cable 22 moves the airbag 24 to the door opening 16 when the cable 22 moves from the undeployed position to the raised position. In some examples, including the example shown in the Figures, the vehicle 10 does not include a middle pillar. In such an example, the cable 22 reinforces the front pillar 12 and the rear pillar 14 in the raised position. Specifically, the cable 22 manages crash energy by distributing forces to the front pillar 12 and the rear pillar 14 during certain vehicle impacts in which the cable 22 is impacted, e.g., side impacts.

Figure 1:
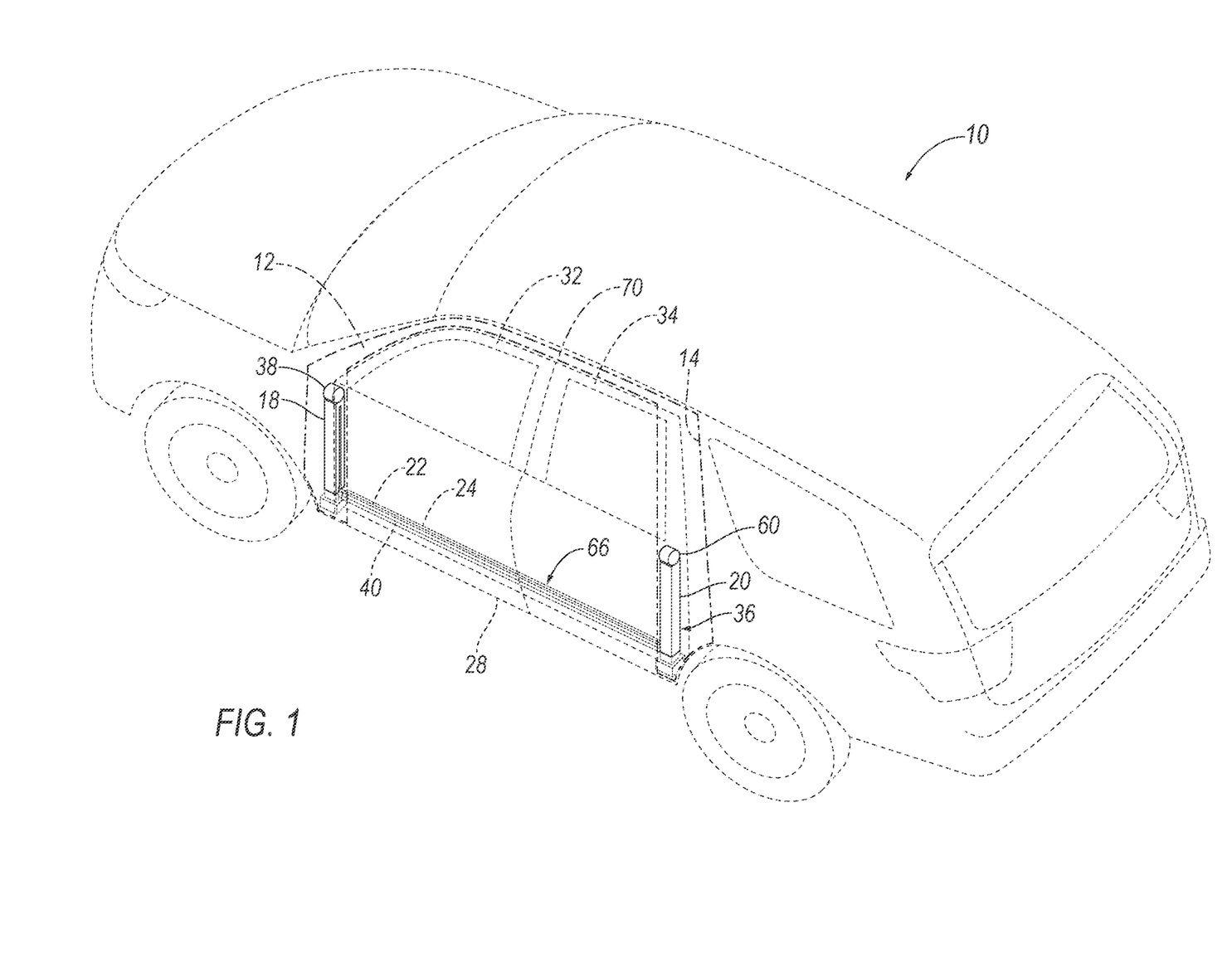
FIG. 1 is a perspective view of a vehicle having an airbag deployment assembly adjacent vehicle doors with the airbag deployment assembly in an undeployed position.
Figure 2:
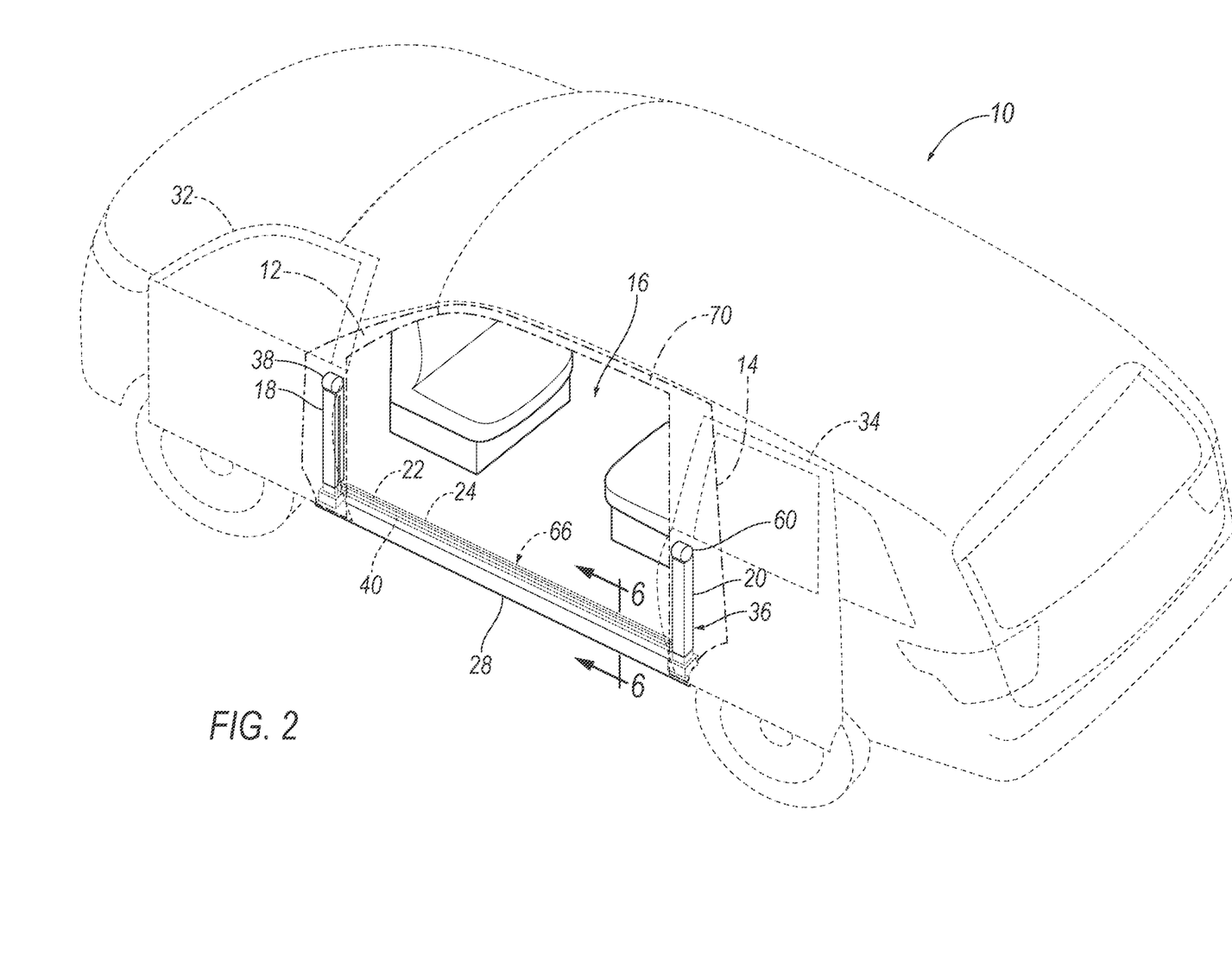
FIG. 2 is a perspective view of the vehicle having the airbag deployment assembly adjacent vehicle doors with the airbag deployment assembly in the undeployed position.
Figure 3:
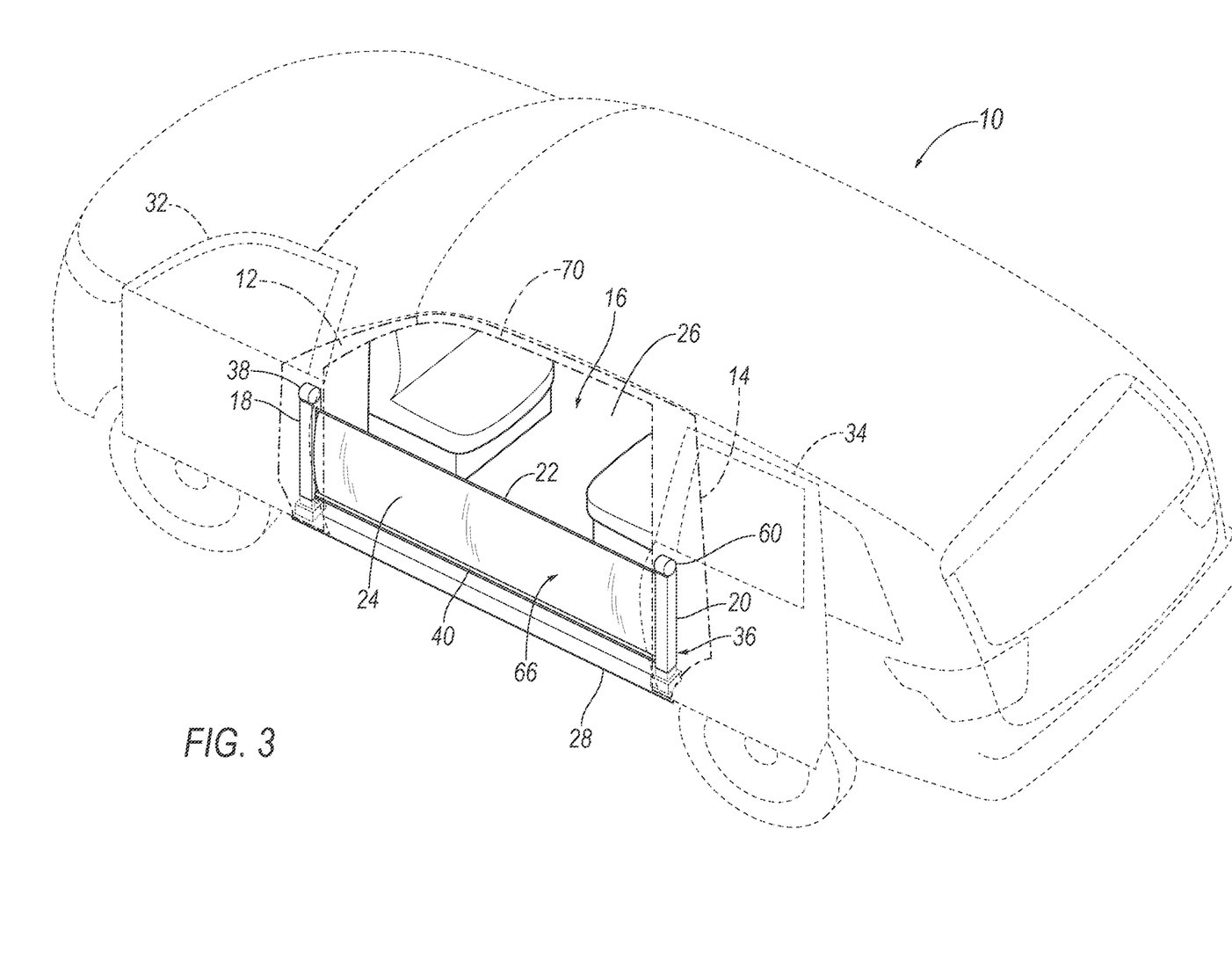
FIG. 3 is a perspective view of the vehicle having the airbag deployment assembly adjacent vehicle doors with the airbag deployment assembly in the raised position.

With reference to FIGS. 1-3, the vehicle 10 may be any suitable type of automobile, e.g., a passenger or commercial automobile such as a sedan, a coupe, a truck, a sport utility, a crossover, a van, a minivan, a taxi, a bus, etc. The vehicle 10, for example, may be autonomous. In other words, the vehicle 10 may be autonomously operated such that the vehicle 10 may be driven without constant attention from a driver, i.e., the vehicle 10 may be self-driving without human input.

The vehicle 10 includes a vehicle body (not numbered) including pillars 12, 14, body panels (including a roof 70, a floor 26, etc.) etc. The vehicle 10 includes a passenger compartment (not numbered) to house occupants, if any, of the vehicle 10. The passenger compartment may extend across the vehicle 10, i.e., from one side to the other side of the vehicle 10. The passenger compartment includes a front end and a rear end with the front end being in front of the rear end during forward movement of the vehicle 10.

The vehicle body includes the floor 26 and may include the roof 70. The roof 70 may define the upper boundary of the passenger compartment and may extend from the front end of the passenger compartment to the rear end of the passenger compartment. The floor 26 is below from the roof 70. The floor 26 may define the lower boundary of the passenger compartment and may extend from the front end of the passenger compartment to the rear end of the passenger compartment.

The vehicle body may include pillars 12, 14 spaced from each along the vehicle-longitudinal axis L on both sides of the vehicle body. Specifically, the vehicle body includes the front pillar 12 and the rear pillar 14 (which may be referred to as a even in examples where there is no middle pillar between the front pillar 12 and the rear pillar 14) spaced vehicle-rearward from the front pillar 12 on each side of the vehicle body. For example, the vehicle body includes the front pillar 12 and the rear pillar 14 on each side of the vehicle 10 with the front pillar 12 being spaced from the rear pillar 14 along the vehicle-longitudinal axis L. In other words, the front pillar 12 may be disposed at the front end of the passenger compartment. The pillars 12, 14 may extend from the roof 70 to the floor 26. The vehicle 10 may include other pillars 12, 14, in addition to the front pillar 12 and the rear pillar 14.

With continued reference to FIGS. 1-3, the vehicle body may not include a middle pillar between the front pillar 12 and the rear pillar 14, i.e., the vehicle body may not include a middle pillar between the front pillar 12 and the rear pillar 14 that extends from the floor 26 to the roof 70. In other words, the vehicle body in FIG. 1-3 has no middle pillar between the front pillar 12 and the rear pillar 14. The vehicle body lacking a middle pillar allows for the door opening 16 to extend from the front pillar 12 to the rear pillar 14. The door opening 16 extending from the front pillar 12 to the rear pillar 14 allows easier occupant ingress and egress to the passenger compartment.

With reference to FIGS. 1-3 and 6, the vehicle body may include a sill 28 extending from the front pillar 12 to the rear pillar 14. Specifically, the vehicle body may include two sills 28, one on each side of the vehicle body. The sills 28 are elongated along the vehicle-longitudinal axis L. The sills 28 may be adjacent the floor 26. The roof 70, sills 28, floor 26, and pillars 12, 14 may be irremovably fixed to each other, i.e., unable to be removed without cutting or other destruction of the roof 70, sills 28, floor 26, and pillars 12, 14. In some examples, the pillars 12, 14 may be unitary with the sills 28 and/or the roof 70, i.e., a single, uniform piece of material with no seams, joints, fasteners, or adhesives connecting the pillars 12, 14 to the sills 28 and/or the roof 70. In such an example, the pillars 12, 14 and sills 28 and/or roof 70 may be formed together simultaneously as a single continuous unit, e.g., by stamping, molding, etc. In other examples, in the alternative to being unitary, the pillars 12, 14 may be formed separately from the sills 28 and/or roof 70 and subsequently connected to the sills 28 and/or roof 70, e.g., by welding.

Figure 6:
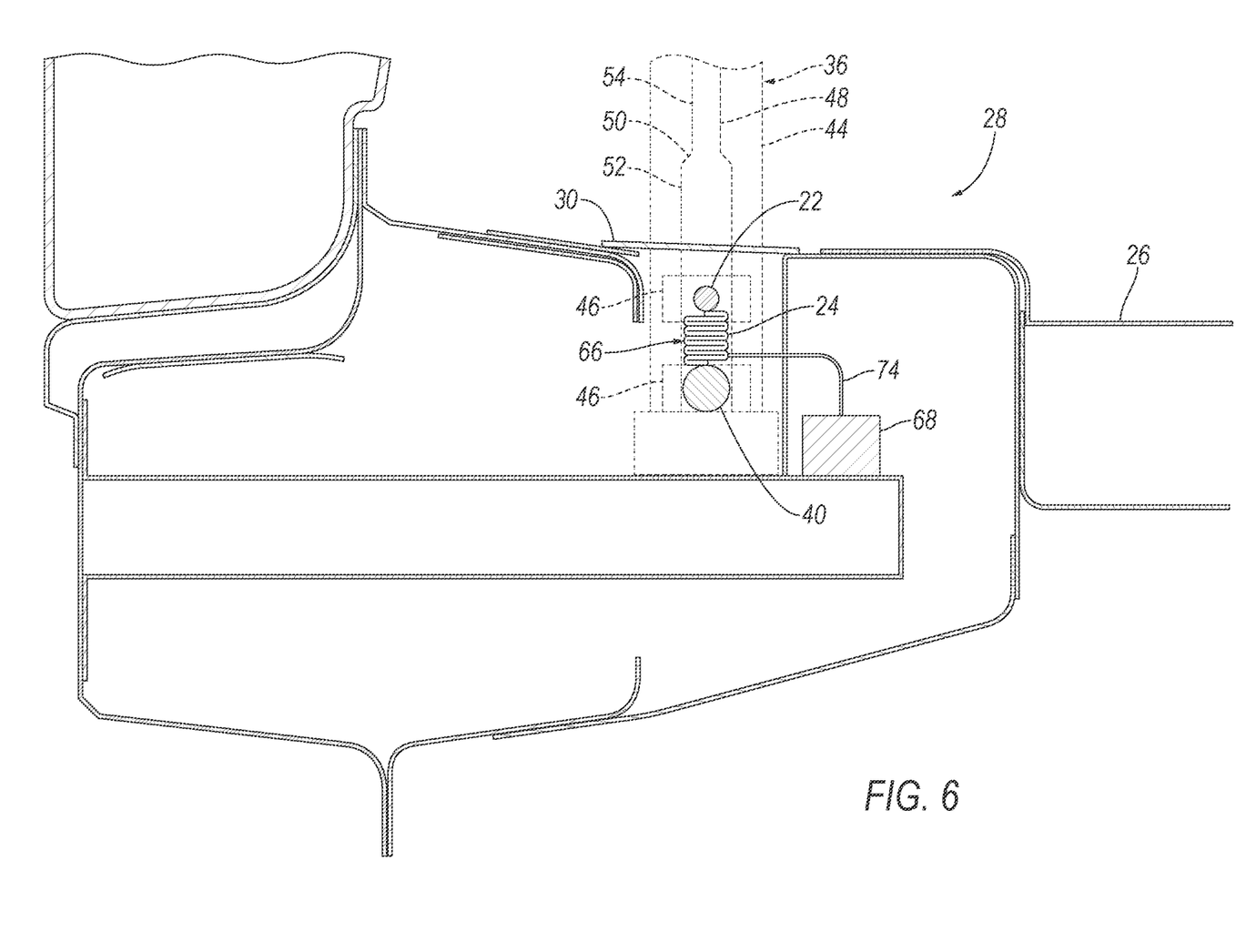
FIG. 6 is a cross-sectional view of FIG. 2 at 6-6.

With reference to FIG. 6, the vehicle body may include a sill covering 30. The sill covering 30 is above the sill 28 and the cable 22 and covers the sill 28 and the cable 22 when the cable 22 is in the undeployed position. As set forth further below, the cable 22 may deploy from and/or through the sill covering 30 from the undeployed position to the raised position, e.g., through a tear seam in the sill covering 30, by dislodging the sill covering 30 from the sill 28, etc.

The sill covering 30 may be between the front pillar 12 and the rear pillar 14 and, specifically, may extend from the front pillar 12 to the rear pillar 14. The sill covering 30 and/or the sill 28 defines the lower-most boundary of the door opening 16. The sill covering 30 faces upwardly and has a class-A surface, i.e., a finished surface exposed to view when doors 32, 34 are open and free of unaesthetic blemishes and defects. The sill covering 30 may be separate from the sill 28 and disposed above the sill 28. In such an example, the sill covering 30 may be fixed to the sill 28, e.g., with clips, fasteners, etc., and may be metal, plastic, fabric. As another example, the sill covering 30 may be unitary with the sill 28, i.e., may be an upper panel of the sill 28.

With reference to FIG. 6, a cross-sectional view through line 6-6 of FIG. 2, the sill 28 may define a channel (not numbered) elongated from the front pillar 12 to the rear pillar 14. The channel may be between the floor 26 and the sill 28. The channel may be sized and shaped to receive the cable 22 when the cable 22 is in the undeployed position. In the example shown in FIG. 6, the cable 22 is received by the channel in the sill 28 when the cable 22 is in the undeployed position.

As set forth above, the vehicle body includes the door opening 16. The front pillar 12 and the rear pillar 14 may define the door opening 16 therebetween. The door opening 16 may be between the sill covering 30 and the roof 70. Specifically, the door opening 16 may extend from the front pillar 12 to the rear pillar 14 and from the sill covering 30 to the roof 70. In other words, the pillars 12, 14 are spaced from each other by the door opening 16 and the roof 70 and sill covering 30 are spaced from each other by the door opening 16. The door opening 16 extends uninterrupted from the front pillar 12 to the rear pillar 14. The door opening 16 extends uninterrupted from the sill covering 30 to the roof 70. The door opening 16 allows for ingress into and egress from the passenger compartment. The vehicle 10 may include any suitable number of door openings 16 to allow for occupant ingress and egress. For example, the vehicle 10 may include one door opening 16 on each side of the vehicle 10. In other examples, the vehicle 10 may include multiple door openings 16 on each side of the vehicle 10.

With reference to FIGS. 1-3, the vehicle 10 may include one or more doors 32, 34 on any side of the vehicle body. As an example, the vehicle 10 may include a front door 32 supported by the front pillar 12 and a rear door 34 supported by the rear pillar 14. The front door 32 and the rear door 34 may be moveably mounted to the vehicle body, e.g., the front pillar 12 and the rear pillar 14, respectively. For example, the front door 32 and the rear door 34 may be slideably mounted (as shown in FIGS. 1-3), hingedly mounted, etc., to the vehicle body. As another example, the vehicle 10 may include a single door slideably mounted to the vehicle body and that extends from the front pillar 12 to the rear pillar 14 when the door is closed.

Figure 7:
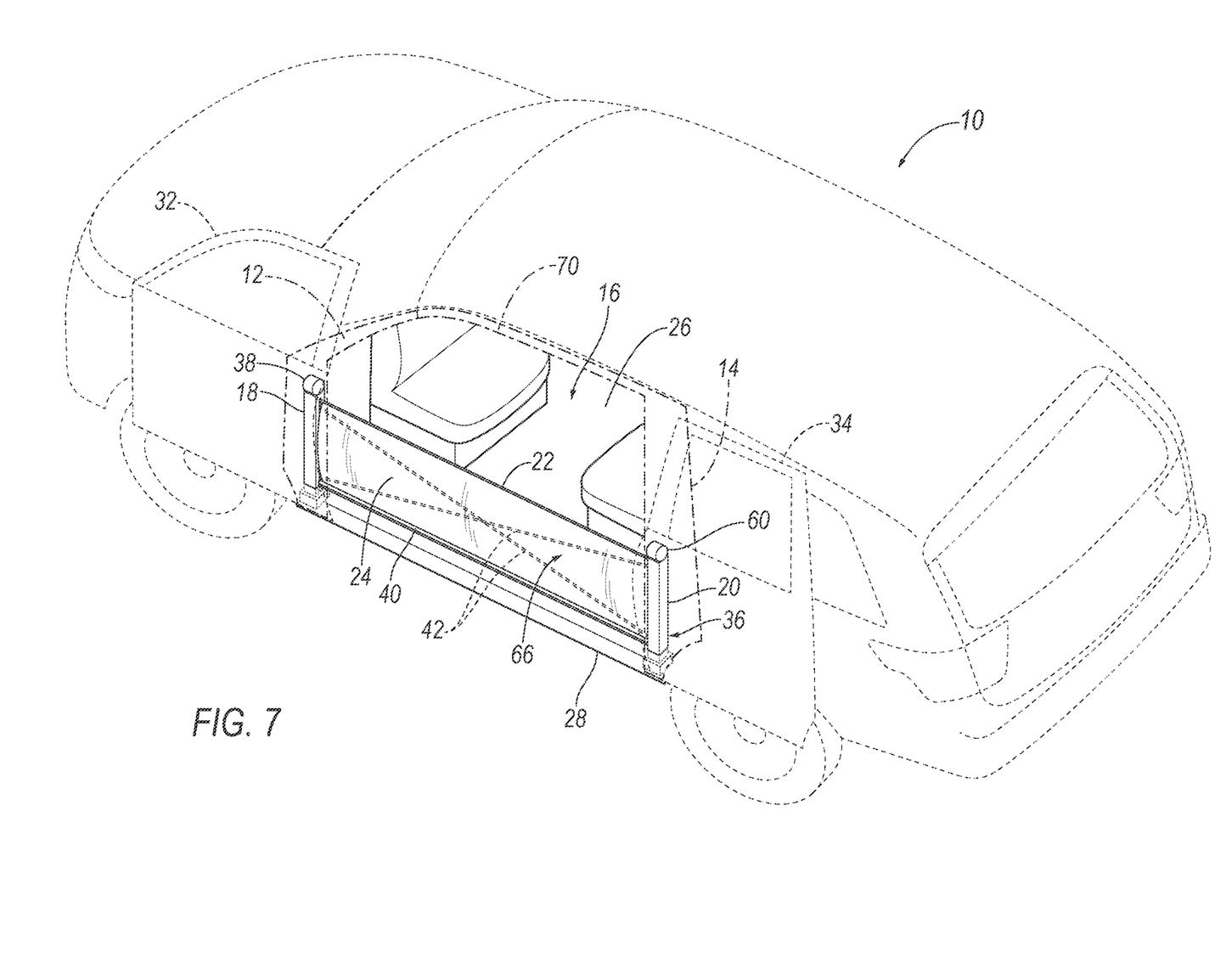
FIG. 7 is a perspective view of the vehicle having the airbag deployment assembly adjacent vehicle doors with the airbag deployment assembly in the raised position.

The vehicle 10 includes an airbag deployment assembly 36 including the first track 18, the second track 20, and the cable 22. The airbag deployment assembly 36 includes at least one actuator 38, e.g., a pyrotechnic actuator 38, that moves the cable 22 to the raised position. As set forth above, the airbag 24 is supported by the cable 22 such that the cable 22 pulls the airbag 24 upwardly from the undeployed position to the raised position. In some examples, the airbag deployment assembly 36 may include two cables 22, 40, namely a first cable 22 and a second cable 40. In such examples, the first cable 22 and the second cable 40 may be generally horizontal. In some examples, such as in FIG. 7, the airbag deployment assembly 36 may include one or more internal tethers 42.

The first cable 22 and the second cable 40 extend across the door opening 16 from the front pillar 12 to the rear pillar 14 in the undeployed position and the raised position. Specifically, the first cable 22 and the second cable 40 extend from a vehicle-forward side of the door opening 16 to a vehicle-rearward side of the door opening 16. The first cable 22 and the second cable 40 extend continuously, i.e., unbroken, from the front pillar 12 to the rear pillar 14 in both the undeployed position and the raised position. The first cable 22 and the second cable 40 are elongated along the sill 28 when the cable 22 is in the raised position and the undeployed position. Specifically, the first cable 22 and the second cable 40 are elongated from the front pillar 12 to the rear pillar 14 along the sill 28 when the cable 22 is in the undeployed position and the raised position.

The first cable 22 and the second cable 40 are vehicle-inboard of the door opening 16 when the cables 22, 40 are in the raised position. Specifically, when the doors 32, 34 are closed, as shown in FIG. 1, the first cable 22 and the second cable 40 are vehicle-inboard of the doors 32, 34 when the cables 22, 40 are in the undeployed position so that the cables 22, 40 are moveable upwardly from the undeployed position to the raised position vehicle-inboard of the door. In the raised position, the first cable 22 and the second cable 40 and the airbag 24 are vehicle-inboard of the door and, specifically, are between the door 32, 34 and the passenger compartment.

The first cable 22 and the second cable 40 are both moveably engaged with the first track 18 and the second track 20 from the undeployed position to the raised position. Specifically, the first cable 22 extends from the first track 18 to the second track 20 across the door opening 16 and the second cable 40 extends from the first track 18 to the second track 20 across the door opening 16. The first cable 22 extends from the first track 18 to the second track 20 across the door opening 16 in the undeployed position and in the raised position.

The first cable 22, as well as the second cable 40 in such examples, may be metal, composite (e.g., carbon fiber), or any other suitable type of material. The cables 22, 40 may be flexible relative to the first track 18, the second track 20, and the sill 28 to allow for deployment of the cable 22 from the undeployed position to the raised position.

The first cable 22 and the second cable 40 are moveably engaged with the first track 18 and the second track 20. Specifically, the first cable 22 and the second cable 40 are both slideably engaged with the first track 18 and the second track 20. In other words, the first cable 22 and the second cable 40 are both retained in a channel 44 of the first track 18 and the second track 20 as the cable 22 moves from the undeployed position to the raised position. The first cable 22 and the second cable 40 are retained in the channel 44 of the first track 18 and the second track 20 in the raised position.

Figure 4A:
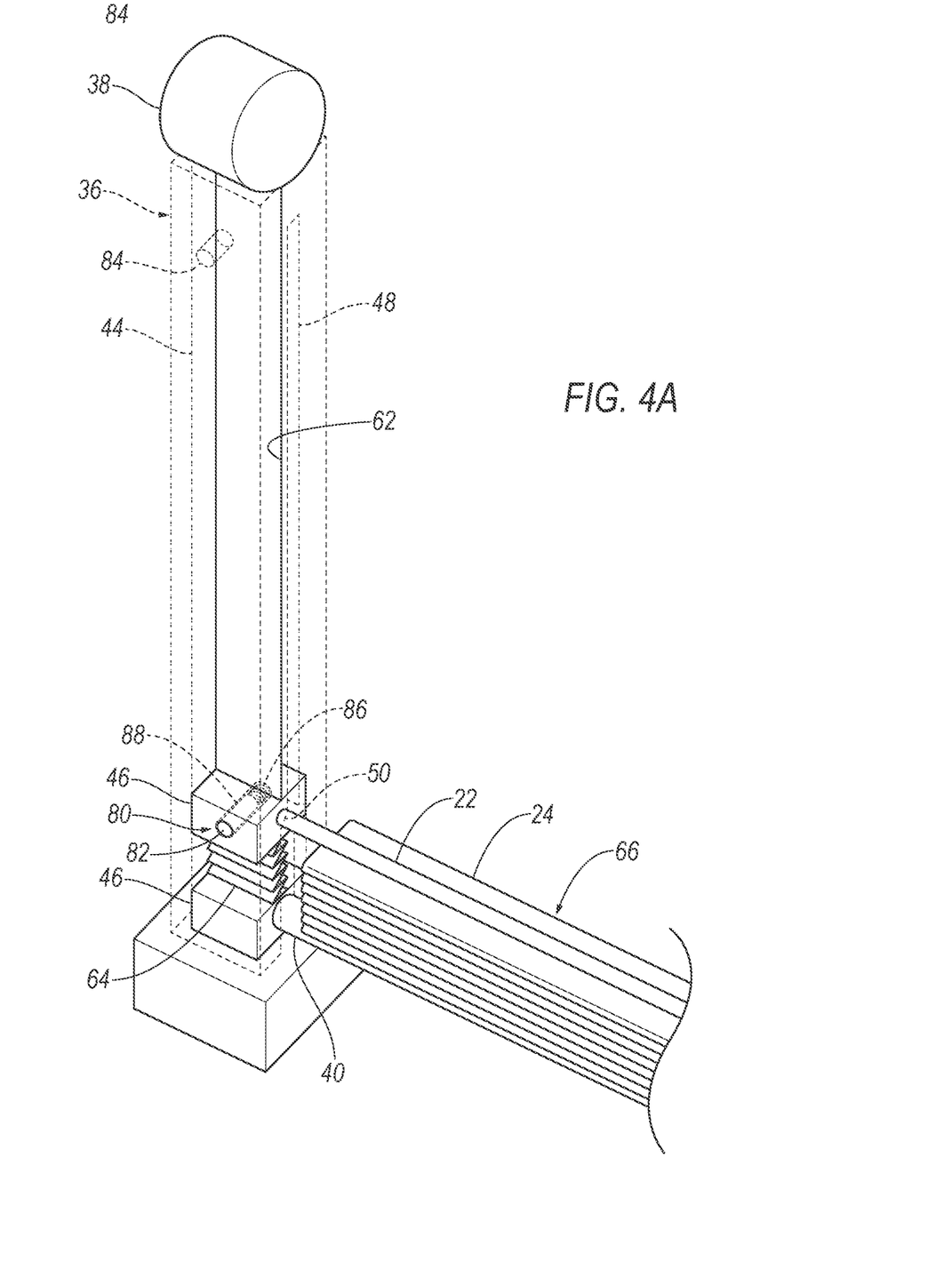
FIG. 4A is a perspective view of the airbag deployment assembly in the undeployed position.
Figure 4B:
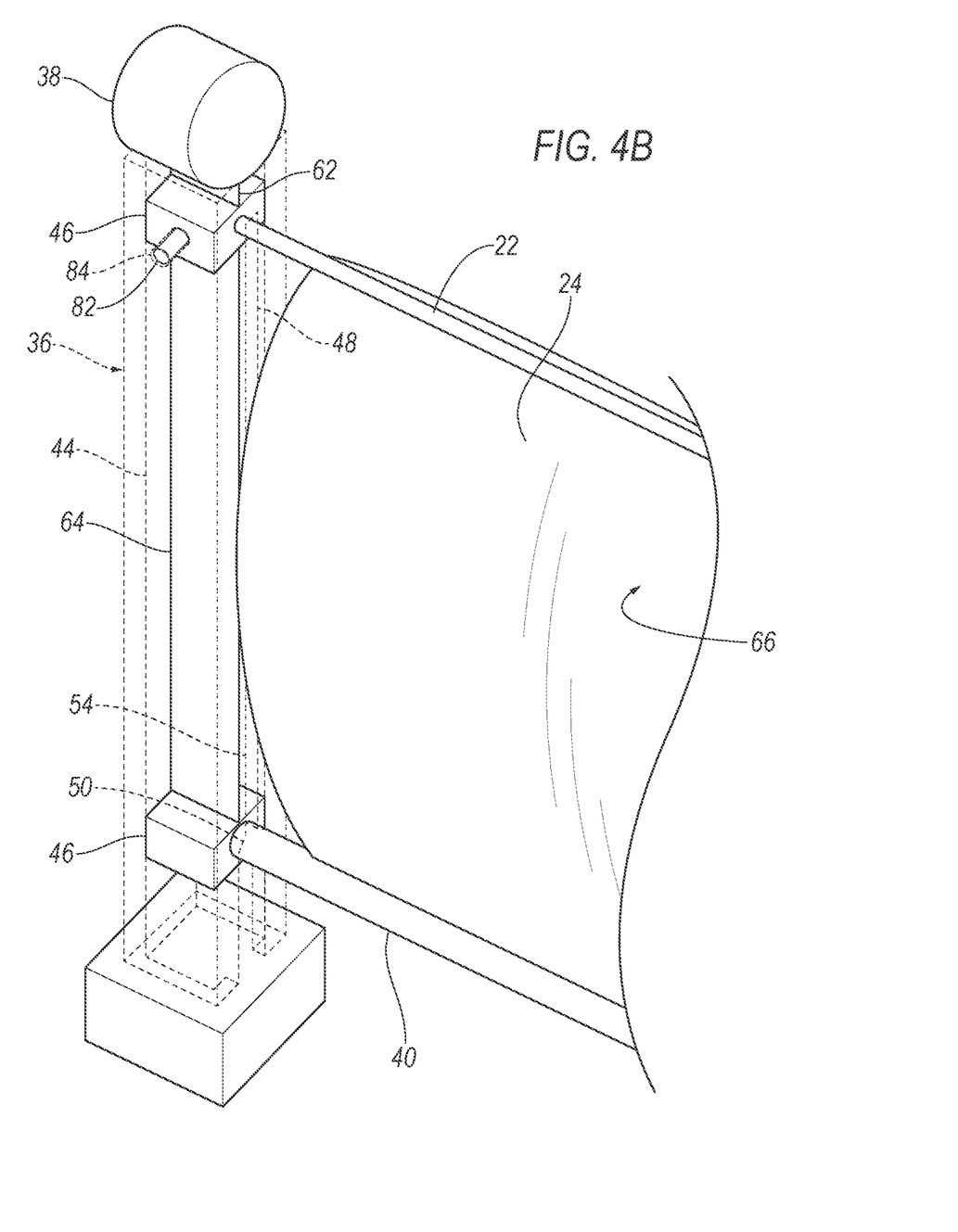
FIG. 4B is a perspective view of the airbag deployment assembly in the raised position.

As an example, with reference to FIGS. 4A-B, the airbag deployment assembly 36 may include shuttles 46 fixed to the cable 22 and slideably engaged with the channel 44 of the first track 18 and the second track 20, respectively. The cable 22 extends through a slot 48. FIGS. 4A-B show one shuttle 46 on the first cable 22 and one shuttle 46 on the second cable 40 slideably engaged with the first track 18 and, in such an example, another shuttle 46 is on the first cable 22 and another shuttle 46 is on the second cable 40 in the second track 20.

The track and the shuttle 46 are designed to retain the shuttle 46 in the track as the shuttle 46 moves with the cable 22 from the undeployed position to the raised position. As an example, the track may have the channel 44 having a C-shaped cross-section and the shuttle 46 may have a rectangular-shaped cross-section that is sized to be slideably retained in the channel 44, as shown in FIGS. 4A-B. The track has a slot 48 leading to the channel 44 and the slot 48 is narrower than the channel 44. The shuttle 46 moves as a unit with the cable 22 from the undeployed position to the raised position. The shuttle 46 may be fixed to the cable 22 in any suitable fashion, e.g., overmolding, crimping, welding, adhesive, etc.

The airbag deployment assembly 36 may include a lock 80 that locks the upper one of the shuttles 46 to the track 18, 20 in the deployed position. In the example shown in FIGS. 4A-B, the lock 80 includes a spring-loaded pin 82 on one of the shuttle 46 and the track 18, 20 and a hole 84 on the other of the shuttle 46 and the track 18, 20. In the example shown in FIGS. 4A-B, the spring-loaded pin 82 is on the shuttle 46, i.e., with a spring 86 retained in a cavity 88 of the shuttle 46, and the hole 84 is on the track 18, 20. In that example, the pin 82 abuts the track 18, 20 and the track depresses the pin 82 into the cavity 88. The pin 82 rides along the track 18, 20 upwardly as the pyrotechnic retractor 38 pulls the shuttle 46 upwardly. When the pin 82 reaches the hole 84, the spring 86 biases the pin 82 into the hole 84 to prevent the shuttle 46 from falling under the force of gravity after operation of the pyrotechnic retractor 38. As set forth above, the length of the lower tether 64 is sized so that the second cable 40 abuts the neck 50 in this position.

As set forth above, the first track 18 is on the front pillar 12 and the second track 20 is on the rear pillar 14. Specifically, the first track 18 is supported by the front pillar 12 and the second track 20 is supported by the rear pillar 14. The first track 18 is fixed relative to the front pillar 12 and the second track 20 is fixed relative to the rear pillar 14. The first track 18 may be unitary with the front pillar 12 and/or the second track 20 may be unitary with the rear pillar 14. In other words, the track and the pillar may be a single, uniform piece of material with no seams, joints, fasteners, or adhesives holding them together, i.e., formed together simultaneously as a single continuous unit, e.g., by stamping and/or machining from a unitary blank, molding, etc. As another example, the track may be non-unitary with the pillar, i.e., track is formed separately and subsequently fixed to the pillar, e.g., with threaded fasteners, welding, etc.

The tracks 18, 20 may extend upwardly in a direction from the floor 26 toward the roof 70. Specifically, the first track 18 and the second track 20 are each elongated generally vertically along the front pillar 12 and the rear pillar 14. Specifically, the tracks 18, 20 may deviate from vertical due to manufacturing or architecture constraints of the vehicle body. The adjectives "first" and "second" with reference to the tracks 18, 20 are used as identifiers and do not indicate order or importance.

The tracks 18, 20 may be concealed from the passenger compartment when the cables 22, 40 are in the undeployed position. For example, the vehicle 10 may include trim panels (not numbered) that cover the tracks 18, 20 in the vehicle 10. In such examples, the trim panels are releasable relative to the pillars 12, 14 during deployment of the cables 22, 40 from the undeployed position to the raised position.

The first cable 22, the second cable 40, and the airbag 24 may be below the sill covering 30 when the cable 22 is in the undeployed position. Specifically, In the undeployed position, the cable 22 and the airbag 24 may be recessed relative to the sill covering 30, the door opening 16, etc., in the undeployed position. Specifically, in the undeployed position, the cable 22 and the airbag 24 are positioned to avoid interference with occupant ingress and egress to the passenger compartment.

The second cable 40 is below the first cable 22 when the first cable 22 and the second cable 40 are in the raised position. The first cable 22 and the second cable 40 are spaced from each other in the raised position. As the first cable 22 moves to the raised position, the first cable 22 pulls the airbag 24 upwardly. The second cable 40 maintains the vertical position of the bottom of the airbag 24.

The engagement of the cables 22, 40 with the tracks 18, 20 may be designed to allow movement of the first cable 22 to a position above the second cable 40 in the raised position. In other words, the second cable 40 is stopped at a position below the first cable 22. As an example, in the example shown in the Figures, the track may be designed (i.e., sized and shaped) to allow the first cable 22 to move upwardly above the second cable 40.

In the example shown in the Figures, the track includes a neck 50 to catch the second cable 40 and stop upward movement of the second cable 40, as shown in FIG. 4B. The neck 50 narrows upwardly. In other words, the neck 50 includes a wide segment 52 and a narrow segment 54 above the wide segment 52. In such an example, the first cable 22 has a smaller diameter than the second cable 40. Specifically, the first cable 22 is sized to move through the neck 50 toward the pyrotechnic actuator 38 and the second cable 40 is sized to engage the neck 50 and stop and the neck 50. In the example in FIGS. 4A-4B, the neck 50 may be unitary with the channel 44 and/or the slot 48 of the track. In other examples, the track may include an insert 56 in the channel 44 and/or the slot 48 that forms the track. In addition or in the alternative, as other examples, the shuttles 46 and the tracks 18, 20 may be designed so that the shuttle 46 on the first cable 22 moves upwardly above the second cable 40.

The first cable 22 extends from the first track 18 to the second track 20 across the door opening 16 in tension between the first track 18 and the second track 20 in the raised position. In other words, the cables 22, 40 and the tracks 18, 20 are designed such that the first track 18 exerts stress on the cables 22, 40 toward the first track 18 and the second track 20 exerts stress on the cables 22, 40 toward the second track 20 in the raised position. Specifically, the length of the cables 22, 40 and the spacing of the first track 18 and the second track 20 are such that the tracks 18, 20 exert opposing forces on the cables 22, 40. The cables 22, 40 may be in tension between the first track 18 and the second track 20 in the undeployed position and/or as the cables 22, 40 move from the undeployed position to the raised position. The cables 22, 40 may maintain a substantially constant length from the first track 18 to the second track 20 as the cables 22, 40 move along the tracks 18, 20 from the undeployed position to the raised position. The tension in the first cable 22 and the second cable 40 in the raised position transmits forces from the cables 22, 40 to the tracks 18, 20 and pillars 12, 14 during certain vehicle impacts, e.g., a side impact. The tension in the first cable 22 allows for the first cable 22 to support the airbag 24 when the first cable 22 is in the raised position and the airbag 24 is inflated. Specifically, the first cable 22 supports an upper end of the airbag 24 to act as a reaction surface for the airbag 24. The tension in the second cable 40, in examples including the second cable 40, allows for the second cable 40 to support a lower end of the airbag 24 when the second cable 40 is in the raised position and the airbag 24 is inflated. For example, in examples including the first cable 22 and the second cable 40, the tension in the first cable 22 and the second cable 40 supports the airbag 24 therebetween and provide upper and lower reaction surfaces for the airbag 24.

The cable 22 structurally interconnects the front pillar 12 and the rear pillar 14 in the raised position. Specifically, the cable 22 provides energy management in the area between the front pillar 12 and the rear pillar 14. As one example, the vehicle 10 as shown in the example in the Figures does not include a middle pillar and, in such an example, the cable 22 and the airbag 24 are deployed across the door opening 16 to reinforce the area traditionally occupied by a middle pillar to enable crash energy management during certain vehicle impacts. In examples including the second cable 40, the second cable 40 structurally interconnects the front pillar 12 and the rear pillar 14 in the raised position and operates similarly to the cable 22 described above.

The airbag 24 is supported by at least one of the first cable 22 and the second cable 40 in the raised position. Specifically, the weight of the airbag 24 is borne by at least one of the first cable 22 and the second cable 40. When the first cable 22 moves from the undeployed position to the raised position, the first cable 22 moves across the door opening 16 and moves the airbag 24 across the door opening 16. In examples including the second cable 40, the airbag 24 is supported by the second cable 40 when the second cable 40 is in the raised position, the second cable 40 operates similarly to the cable 22 described above.

The airbag 24 is moveable with the cable 22 from the undeployed position to the raised position. Specifically, the cable 22 and the airbag 24 are recessed below the sill 28 in the retracted position, as shown in FIGS. 1 and 2, and the cable 22 and the airbag 24 are raised relative to the sill 28 to the raised position in which the cable 22 moves above the sill 28. As shown in FIG. 3, the airbag 24 is inflated when the cable 22 is in the raised position. The airbag 24 may be inflated from an uninflated position to an inflated position simultaneously with the deployment of the cable 22 upwardly, e.g., activation of the pyrotechnic actuator 38, or inflation of the airbag 24 may be delayed, e.g., 10-30 milliseconds, after the activation of the pyrotechnic actuator 38. A computer 58 of the vehicle 10, e.g., a restraints control module, may instruct the activation of the pyrotechnic actuator 38. The computer 58 may instruct the activation of the pyrotechnic actuator 38 and the inflator 68 in response to certain detected vehicle impacts, e.g., a side impact.

The airbag 24 is positioned between the cable 22 and the second cable 40 in the raised position to control the kinematics of the occupant through supplemental restraints in the event of a certain vehicle side impacts. The airbag 24 may extend from the front pillar 12 to the rear pillar 14 in the raised position and the undeployed position. Specifically, the airbag 24 may extend from a vehicle-forward end of the cable 22 supported by the front pillar 12 to a vehicle-rearward end of the cable 22 supported by the rear pillar 14. Specifically, the airbag 24 extends continuously, i.e., unbroken, across the door opening 16, e.g., from the front pillar 12 to the rear pillar 14 in both the undeployed position and the raised position. The airbag 24 is vehicle-inboard of the door opening 16 in the undeployed position and in the raised position. The airbag 24 may be elongated along the vehicle-longitudinal axis L between the front pillar 12 to the rear pillar 14 when the cable 22 is in the raised position.

The airbag 24 may extend from the cable 22 to the second cable 40 when the cable 22 is in the raised position. In the example shown in the Figures, the airbag 24 is connected directly to the cable 22 and the second cable 40 in the raised position. For example, the cable 22 and the second cable 40 may be sewn and/or adhered to the airbag 24. As an example, a sheet of the airbag 24 may be wrapped around the cable 22 and sewn, bonded, and/or adhered to itself. As another example, the airbag 24 may include loops of fabric that wrap around the cable 22. The connection of the airbag 24 to the cable 22 has sufficient strength with withstand forces applied by the cable 22 on the airbag 24 as the cable 22 moves upwardly along the track during deployment.

As set forth above, in some examples, the airbag deployment assembly 36 may include internal tethers 42. The internal tethers 42 may extend diagonally across the airbag 24. The internal tethers 42 may extend across the airbag from an area of the airbag 24 near or at the first cable 22 to the an area of the airbag 24 near or at the second cable 40 to shape the airbag 24. In the example shown in FIG. 7, the airbag deployment assembly 36 includes two internal tethers 42 that cross each other. The transverse cables 42 may be in tension between the first cable 22 and the second cable 40 in the raised position. The transverse cables 42 may be connected to the rest of the airbag 24, e.g., sewn, bonded, adhered, loops of fabric, etc. The internal tethers 42 are in an inflation chamber 78 of the airbag 24

As shown in FIGS. 2-5, the airbag deployment assembly 36 may include one or more pyrotechnic actuator 38 to move the first cable 22 and the airbag 24 (and the second cable 40 in such examples) from the undeployed position to the raised position. In the example shown in the Figures, the airbag deployment assembly 36 includes a first pyrotechnic actuator 38 fixed relative to the first track 18 and a second pyrotechnic actuator 60 fixed to the second track 20.

The pyrotechnic actuator 38 may be positioned at a top end of the track. The first pyrotechnic actuator 38 may be fixed (e.g., with threaded fastener, welding, etc.) to the front pillar 12 and/or the first track 18 and the second pyrotechnic actuator 60 may be fixed to the rear pillar 14 and/or the second track 20.

Figure 5:
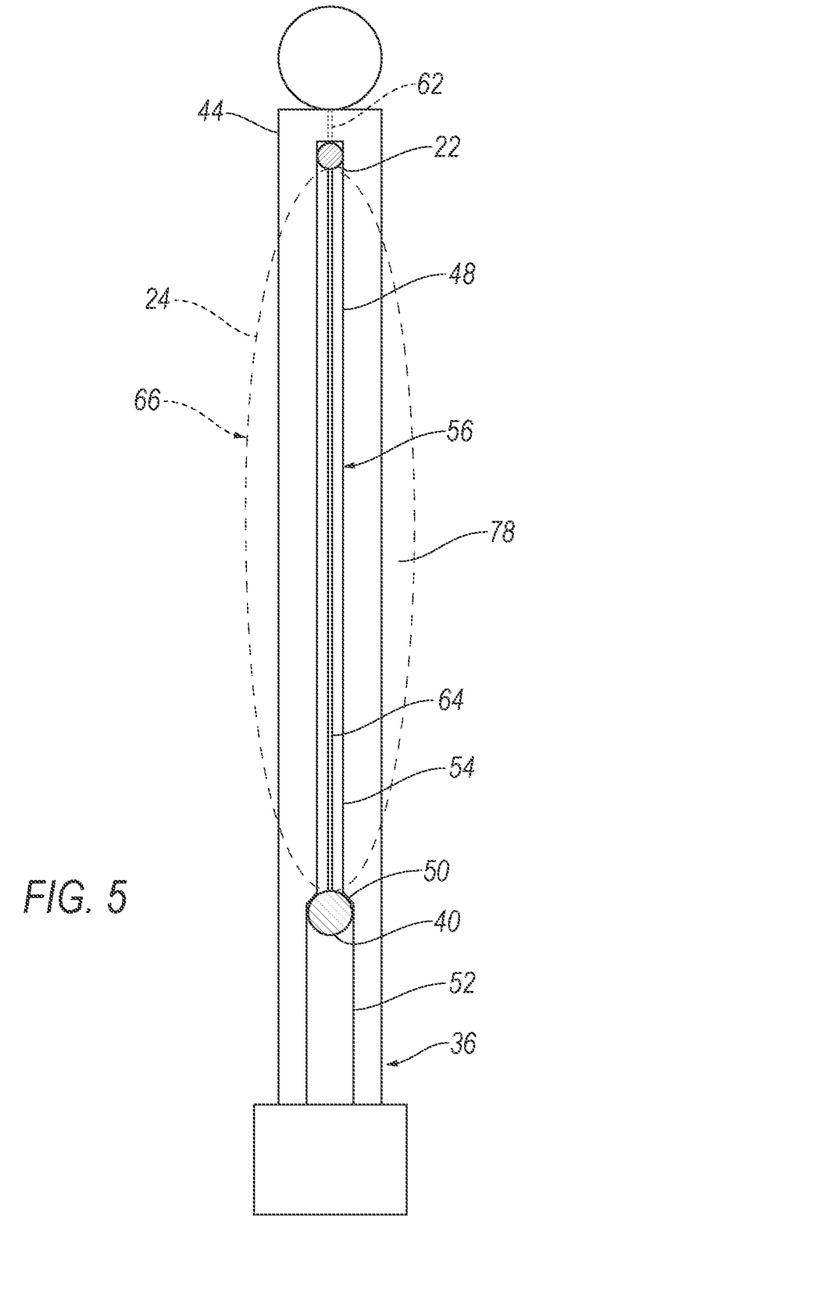
FIG. 5 is a side view of the airbag deployment assembly in the raised position.

The pyrotechnic actuator 38 is operatively connected to the first cable 22 to raise the first cable 22 to the raised position. The pyrotechnic actuator 38 pulls the cable 22 to the raised position when the pyrotechnic actuator 38 is activated. As one example, the pyrotechnic actuator 38 may be indirectly connected to the cable 22. As shown in the example in the Figures the airbag deployment assembly 36 includes a tether 62 extending from the first cable 22 to the pyrotechnic actuator 38. Specifically, the tether extends from the shuttle 46 to the pyrotechnic actuator 38, as shown in FIGS. 4A-5. The tether 62 is retracted into the pyrotechnic actuator 38 when activated to pull the first cable 22 upwardly along the tracks 18, 20. In other examples, the pyrotechnic actuator 38 may be directly connected to the cable 22, i.e., there are no other components between the pyrotechnic actuator 38 and the cable 22.

As shown in FIGS. 1-3, a first tether 62 extends from the first pyrotechnic actuator 38 to the first cable 22 and a second tether 62 extends from the second pyrotechnic actuator 60 to the first cable 22. Specifically, the first tether 62 may extend along the first track 18 and the second tether 62 may extend along the second track 20 (the first tether 62 in the first track 18 is shown in FIGS. 4A-5 and the second tether 62 in the second track 20 may be identical to the first tether 62). Specifically, the first tether 62 may extend through the channel 44 of the first track 18 from the first pyrotechnic actuator 38 to the first cable 22 and the second tether 62 may extend through the channel 44 of the second track 20 from the second pyrotechnic actuator 60 to the first cable 22. When the pyrotechnic actuator 38 is actuated in the event of an impact to the vehicle 10, the tethers 62 retract toward the pyrotechnic actuators 38, 60 along the channel 44.

The first tether 62 is connected to the vehicle-forward end of the first cable 22 and the second tether 62 is connected to the vehicle-rearward end of the first cable 22. In the event of certain vehicle impacts, the first pyrotechnic actuator 38 and the first tether 62 pull the vehicle-forward end of the first cable 22 upwardly and the second pyrotechnic actuator 60 and the second tether 64 pull the vehicle-rearward end of the first cable 22 upwardly.

In the examples shown in the figures, the tethers 62 are connected to the top ones of the shuttles 46, e.g., by crimping, welding, adhesive, etc. In other examples, the tethers 62 may be connected directly to the first cable 22.

The pyrotechnic actuator 38 may be any suitable type such as a rotary actuator 38, in which a pyrotechnic charge rotates a shaft connected to the tether 62 such that the tether 62 wraps around the shaft; a piston linkage, in which the pyrotechnic charge for example, drives a piston attached to the tether 62; a ball-in-tube linkage, in which a pyrotechnic charge propels a ball or balls over a cogwheel connected to the tether 62; a mechanical linkage, in which a compressed spring attached to the tether 62 is released; or any other suitable type.

The pyrotechnic charge of the pyrotechnic actuator 38 activates components of the pyrotechnic actuator 38 to retract the tether 62. The pyrotechnic charge is combustible to produce a gas. The pyrotechnic charge may be formed of a solid mixture of substances that, when ignited, react to produce the gas. For example, the pyrotechnic charge may be formed of sodium azide ($NaNO_3$), potassium nitrate ($KNO_3$), and silicon dioxide ($SiO_2$), which react to form nitrogen gas ($N_2$).

With reference to FIGS. 4A-5, the airbag deployment assembly 36 may include a lower tether 64 extending from the first cable 22 and the second cable 40. The lower tether 64 pulls the second cable 40 upwardly as the first cable 22 pulls the lower tether 64 upwardly, as shown in FIGS. 4A-B. Specifically, the lower tether 64 has a length that pulls the second cable 40 against the neck 50 when the pyrotechnic actuator 38 retracts the tether 62. The lower tether 64 may be connected to the shuttles 46, e.g., by crimping, welding, adhesive, etc. In other examples, the lower tether 64 may be connected directly to the first cable 22. The lower tether 64 may be the same material as the tether 62.

The vehicle 10 includes an airbag assembly 66 including the airbag 24. The airbag assembly 66 includes an inflator 68 in fluid communication with the airbag 24 to inflate the airbag 24 to the inflated position.

The inflator 68 expands the airbag 24 with inflation medium, such as a gas, to move the airbag 24 from the uninflated position to the inflated position. The inflator 68 may be supported by any suitable component. For example, the inflator 68 may be supported by a housing (not shown). The inflator 68 may be, for example, a pyrotechnic inflator 68 that ignites a chemical reaction to generate the inflation medium, a stored gas inflator 68 that releases (e.g., by a pyrotechnic valve) stored gas as the inflation medium, or a hybrid. The inflator 68 may be, for example, at least partially in an inflation chamber 78 to deliver inflation medium directly to the inflation chamber 78 or may be connected to the inflation chamber 78 through fill tubes 74, diffusers, etc. Specifically, the inflator 68 may be fixed to the vehicle body and connected with the inflation chamber 78 through fill tubes 74 and/or diffusers that move with the airbag 24 as the airbag 24 is raised relative to the vehicle body from the undeployed position to the raised position.

The airbag 24 may be fabric, e.g., a woven polymer yarn. The woven polymer yarn may be, for example, nylon 6, 6. Other examples of the woven polymer yarn include polyether ether ketone (PEEK), polyetherketoneketone (PEKK), polyester, etc. The woven polymer yarn may include a coating, such as silicone, neoprene, urethane, etc. For example, the coating may be polyorgano siloxane.

Figure 8:
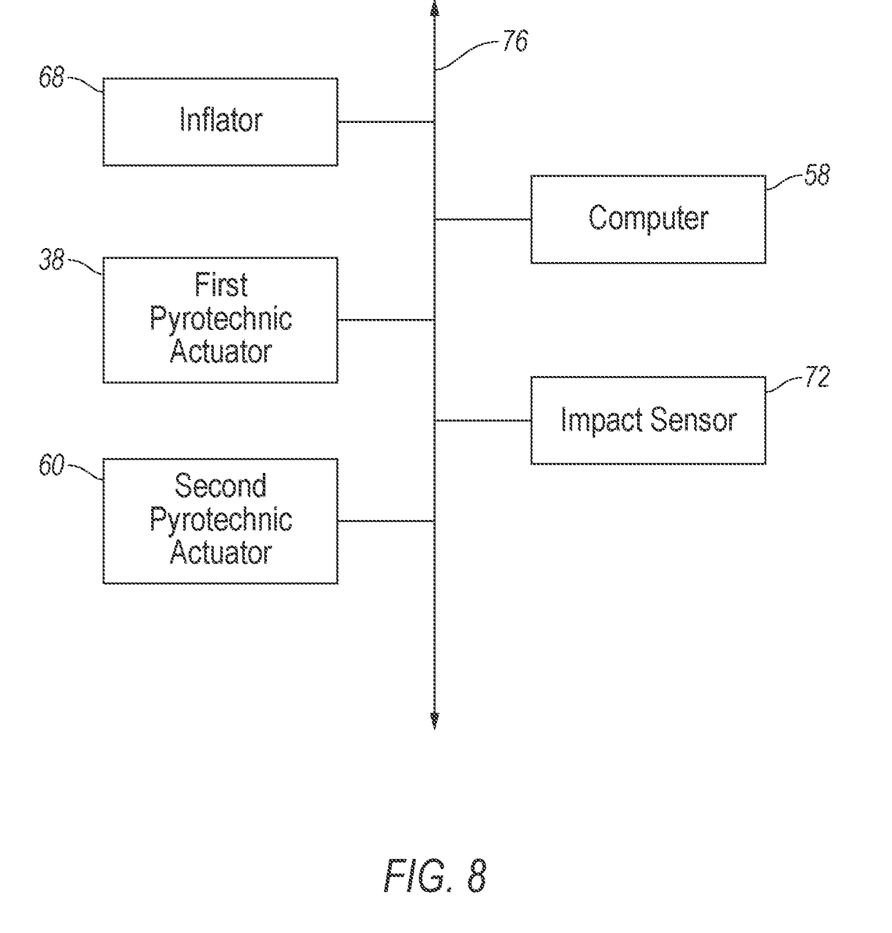
FIG. 8 is a block diagram of a system of the vehicle.

With reference to FIG. 8, the vehicle 10 may include at least one impact sensor 72 for sensing impact of the vehicle 10 and a computer 58 in communication with the impact sensor 72. Alternatively or additionally to sensing impact, the impact sensor 72 may be configured to sense impact prior to impact, i.e., pre-impact sensing. The impact sensor 72 is configured to detect an impact to the vehicle 10. The impact sensor 72 may be of any suitable type, for example, post contact sensors such as accelerometers, pressure sensors, and contact switches; and pre impact sensors such as radar, LIDAR, and vision sensing systems. The vision sensing systems may include one or more cameras, CCD image sensors, CMOS image sensors, etc. The impact sensor 72 may be located at numerous points in or on the vehicle 10.

The computer 58 includes a processor and a memory. The memory includes one or more forms of computer readable media, and stores instructions executable by the processor for performing various operations, including as disclosed herein. For example, the computer 58 can be a generic computer with a processor and memory as described above and/or may include an electronic control unit ECU or controller for a specific function or set of functions, and/or a dedicated electronic circuit including an ASIC that is manufactured for a particular operation, e.g., an ASIC for processing sensor data and/or communicating the sensor data. In another example, the computer 58 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in a computer 58. The memory can be of any type, e.g., hard disk drives, solid state drives, servers, or any volatile or non-volatile media. The memory can store the collected data sent from the sensors. The memory can be a separate device from the computer 58, and the computer 58 can retrieve information stored by the memory via a network in the vehicle 10, e.g., over a CAN bus, a wireless network, etc. Alternatively or additionally, the memory can be part of the computer 58, e.g., as a memory of the computer 58. The computer 58 may include or be communicatively coupled to, e.g., via a vehicle communication network 76 such as a communications bus as described further below, more than one processor, e.g., included in components such as sensors, electronic control units (ECUs) or the like included in the vehicle 10 for monitoring and/or controlling various vehicle components. As shown in FIG. 8, the computer 58 is generally arranged for communications on a vehicle communication network 76 that can include a bus in the vehicle 10 such as a controller area network CAN or the like, and/or other wired and/or wireless mechanisms. Alternatively or additionally, in cases where the computer 58 actually comprises a plurality of devices, the vehicle communication network 76 may be used for communications between devices represented as the computer 58 in this disclosure. Various controllers and/or sensors may provide data to the computer 58 via the vehicle communication network 76.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
   a front pillar and a rear pillar spaced along a vehicle-longitudinal axis, the front pillar and the rear pillar defining a door opening therebetween;
   a first track on the front pillar and a second track on the rear pillar;
   a cable moveably engaged with the first track and the second track and moveable upwardly from an undeployed position to a raised position, the cable extending across the door opening from the first track to the second track in the raised position; and
   an airbag moveable with the cable upwardly from the undeployed position to the raised position, the airbag being supported by the cable in the raised position.

2. The vehicle of claim 1, further comprising a first pyrotechnic actuator fixed to the front pillar and operatively connected to the cable to move the cable to the raised position and a second pyrotechnic actuator fixed to the rear pillar and operatively connected to the cable to move the cable to the raised position.

3. The vehicle of claim 2, further comprising a first tether extending from the first pyrotechnic actuator to the cable and a second tether extending from the second pyrotechnic actuator to the cable.

4. The vehicle of claim 3, wherein the first tether is connected to a vehicle-forward end of the cable and the second tether is connected to a vehicle-rearward end of the cable.

5. The vehicle of claim 1, further comprising a pyrotechnic actuator fixed relative to the first track and the second track and operatively connected to the cable.

6. The vehicle of claim 1, further comprising a second cable below the cable in the raised position, the airbag extending from the cable to the second cable when the cable is in the raised position.

7. The vehicle of claim 6, wherein the second cable is moveably engaged with the first track and the second track from an undeployed position to a raised position, the second cable extending across the door opening from the first track to the second track in the raised position.

8. The vehicle of claim 6, wherein the airbag is supported by the second cable when the second cable is in the raised position.

9. The vehicle of claim 6, further comprising a sill covering between the front pillar and the rear pillar; the cable, the second cable, and the airbag being below the sill covering when the cable and the second cable are in the undeployed position.

10. The vehicle of claim 1, wherein the airbag extends from the front pillar to the rear pillar when the cable is in the raised position.

11. The vehicle of claim 1, wherein the airbag is elongated along the vehicle-longitudinal axis between the front pillar to the rear pillar when the cable is in the raised position.

12. The vehicle of claim 1, further comprising a sill covering between the front pillar and the rear pillar; the cable and the airbag being below the sill covering when the cable is in the undeployed position.

13. The vehicle of claim 1, wherein the cable and the airbag are vehicle-inboard of the door opening when the cable is in the raised position.

14. The vehicle of claim 1, further comprising a front door supported by the front pillar and a rear door supported by the rear pillar, the front door and the rear door each being moveable from an open position to a closed position, the front door and the rear door abutting each other in the closed position.

15. The vehicle of claim 14, wherein the cable is vehicle-inboard of the front door and the rear door when the cable is in the raised position and the doors are in the closed position.

16. The vehicle of claim 1, wherein the first track and the second track are each elongated generally vertically.

17. The vehicle of claim 1, wherein the cable structurally interconnects the front pillar and the rear pillar in the raised position.

18. A vehicle comprising:
a front pillar and a rear pillar spaced along a vehicle-longitudinal axis, the front pillar and the rear pillar defining a door opening therebetween;
a first track on the front pillar and a second track on the rear pillar;
a cable moveably engaged with the first track and the second track from an undeployed position to a raised position, the cable extending across the door opening from the first track to the second track in the raised position;
an airbag moveable with the cable from the undeployed position to the raised position, the airbag being supported by the cable in the raised position; and
a second cable below the cable in the raised position, the airbag extending from the cable to the second cable when the cable is in the raised position;
the airbag being supported by the second cable when the second cable is in the raised position.

19. The vehicle of claim 18, further comprising:
a sill covering between the front pillar and the rear pillar;
the cable, the second cable, and the airbag being below the sill covering when the cable and the second cable are in the undeployed position.

* * * * *